July 7, 1925.
C. BERTHIEZ
1,544,797
REVERSING GEAR FOR PLANERS AND LIKE MACHINE TOOLS
Filed Sept. 15, 1920   2 Sheets-Sheet 1
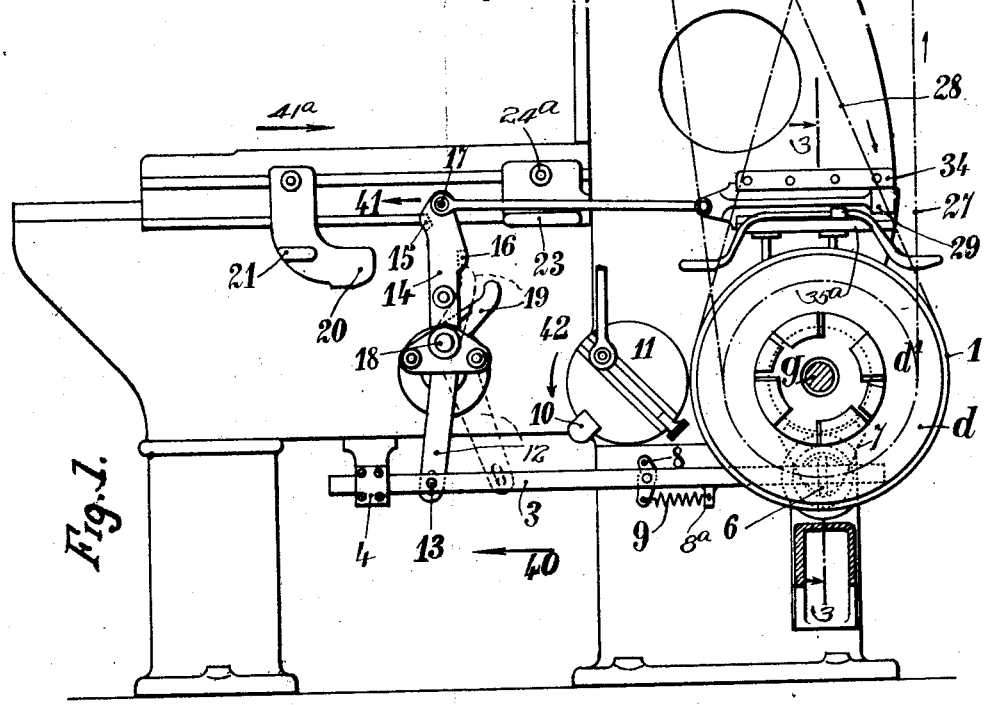
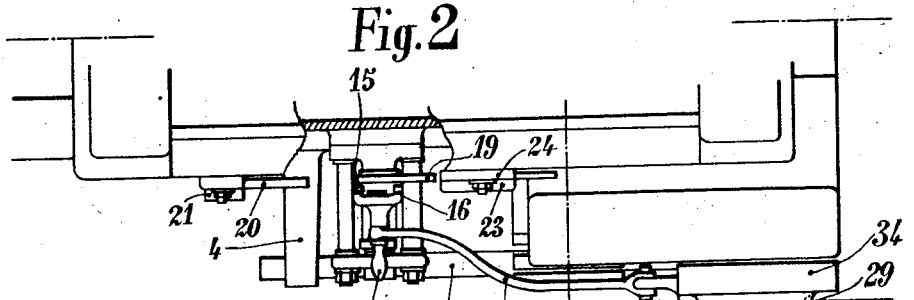
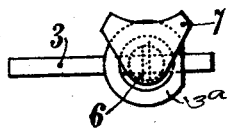
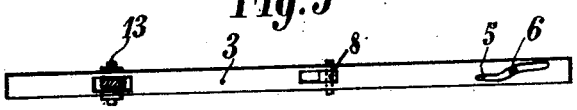
Inventor
C. Berthiez
By H. R. Kerelake
Atty.

July 7, 1925.
C. BERTHIEZ
1,544,797
REVERSING GEAR FOR PLANERS AND LIKE MACHINE TOOLS
Filed Sept. 15, 1920
2 Sheets-Sheet 2

Inventor
C. Berthiez
By H. R. Kenelake
Atty.

Patented July 7, 1925.

1,544,797

UNITED STATES PATENT OFFICE.

CHARLES BERTHIEZ, OF PARIS, FRANCE.

REVERSING GEAR FOR PLANERS AND LIKE MACHINE TOOLS.

Application filed September 15, 1920. Serial No. 410,427.

*To all whom it may concern:*

Be it known that CHARLES BERTHIEZ, citizen of the French Republic, residing at Paris, 44 Rue Lafayette, has invented certain new and useful Improvements in or Relating to Reversing Gear for Planers and like Machine Tools, of which the following is a specification.

In the actual control devices for the tables of planing machines, when the table is about to terminate a working stroke, it is necessary, in order to check its speed, to absorb the inertia it possesses at the time the tool terminates its cutting stroke. This inertia is composed of two factors:

First, the driving power supplied by the driving member, which driving power continues to act with the value it possesses during the action of the tool, and an appreciable time after the latter no longer engages with the metal to be worked; second, the inertia due to the speed of movement of the table.

In the case of heavy losses involved in obtaining high cutting powers, a period of time is necessary for reducing the speed of the table to zero, that is to say, for absorbing the inertia it possesses at the time the tool ceases its operation, if shocks prejudicious to the security of parts of the machine are to be avoided.

An appreciable loss of time is thus caused, which diminishes the output of the planing machine, that is to say, the weight of planings removed in the unit of time per unit of power.

The object of this invention is to increase this output by shortening the time necessary for the absorption of the inertia of the table in order to reduce its speed to zero and to return it rapidly at the beginning of a new working stroke.

This invention consists in means adapted to eliminate a large portion of power supply to be used in tables for the work, and supplying to the same only the power necessary for rapidly returning it to its original position. The first factor of the total inertia to be absorbed is thus diminished, and consequently, the time necessary for the absorption of these inertias also diminished, so that the output of the machine is increased.

In other words, the present invention includes means for moving the table during its working stroke, and auxiliary means for supplying additional power to the table during the actual working period. The throwing in and out of gear of the member transmitting the additional power to the driving shaft of the table are, in the present invention, automatically obtained by means of a series of cams and push pieces connected to the various elements of the main parts of the planing machine.

By way of example, a construction according to the present invention will now be described in connection with the accompanying drawing, in which:

Figure 1 is a partial side view of a planing machine provided with a device forming the subject-matter of the invention, a part of this Figure 1 being a section taken on line 1—1 of Figure 3.

Fig. 2 is a plan view of the same device, the edge of the table being partially cut away.

Fig. 4 is a front view of a portion of the device for throwing in and out of gear the pulley supplying the additional power during the working period.

Fig. 5 is a plan view of the bar forming part of the last mentioned device.

Figure 3:
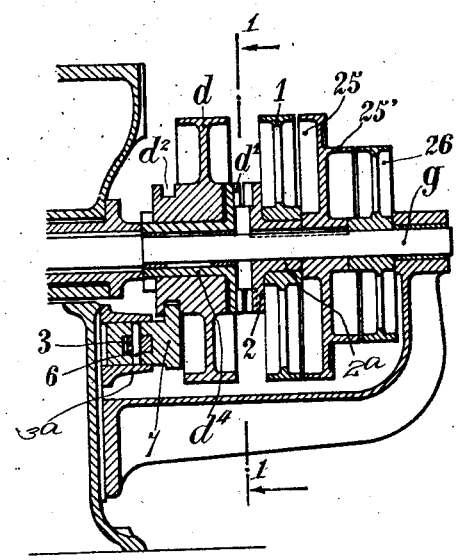
Fig. 3 is a vertical sectional view taken on line 3—3 of Figure 1.

In the drawings, the shaft $g$ is the drive shaft of the plane, that is, the shaft which effects the movements of the table toward the right and left.

A pulley 25 is keyed on said shaft and this pulley may be driven by a crossed belt 28, and in such case the shaft $g$ rotates in a clockwise direction corresponding to the working travel of the table $b$ (in the direction of the arrow $41^a$). The pulley 25' is integral with pulley 25, and this pulley 25' may be operated by a straight belt 27, for the purpose of reversely rotating the shaft $g$ to rapidly return the table $b$ in a direction opposite to the arrow $41^a$.

It will be apparent that the mechanism hereinafter described, is such that the belt 28 cannot actuate the pulley 25 at the same time as the belt 27 actuates the pulley 25' and vice versa.

A pulley $d$ is keyed on a sleeve $d^4$, which is loosely mounted on the drive shaft $g$. The outer end of the sleeve has a clutch face $d'$ adapted to engage a similar clutch face 2 mounted on a sleeve $2^a$ that is keyed to the shaft $g$. A pulley 1 is loosely mounted on the sleeve 2 and a pulley 26 is loose on shaft $g$.

A clutch fork 7 engages a groove $d^2$ of the pulley $d$ and the movement of said fork (parallel to the drive shaft $g$) causes the clutch face $d'$ to be moved into engagement with the clutch face 2 or to be moved away from the latter, (see Fig. 3).

Fork 7 is guided in the bore of a boss $3^a$ which is fixed to the frame of the machine and the movement of the fork 7 is controlled, as explained hereinafter, by a sliding bar 3, which is axially moved in a plane perpendicular to that of the plane in which the fork 7 moves. The bar 3 is guided at one end in a bearing 4 fixed to the frame and its other end slides through aligned slots in the boss $3^a$ and fork 7.

The bar 3 is connected by pivot pin 13 to a lever 12—19 that is pivotally mounted on an axle 18, fixed to the frame of the plane. A disk 11, which during the course of the working stroke of the plane, turns in the direction of the arrow 42, carries a lug 10, in the path of movement of which is placed a dog 8, that is pivoted on the bar 3. A spring 9 connects the lower end of the dog to lug $8^a$ on the bar 3 and this spring is sufficiently strong to normally hold the lug 8 in the position shown in Fig. 1, so that when the lug 10 strikes the dog 8 it will move the bar 3 toward the right. However, if there is any binding in the mechanism, which prevents the bar 3 from moving toward the right, then the lug 10 will merely swing the dog 8 on its pivot and stretch the spring 9. Consequently the lug 10 will pass by the dog 8 without moving the bar 3 toward the right.

The plate 11 is operatively connected to the mechanism (not shown) which intermittently controls the advance of the tool, that is, which regulates the thickness of the metal shaving removed at each working stroke.

The belts 27 and 28 pass respectively through loops 33 and 32. These loops are carried by arms, pivotally mounted at 36 and 35, on a plate $35^a$, which is fixed on the frame of the machine. Pins 38 and 37, fixed respectively to the arms of the loops 33 and 32, project into cam slots 31—31' and 30—30', which are cut in a slide 29 mounted on a stationary guide 34 on the frame of the machine. The slots comprise portions 30' and 31' parallel to the movements of the slide 29 and oblique portions 30 and 31, for a purpose hereinafter described. The slide 29 is connected by a rod 22 to the upper end of a lever 14 which is pivoted on the axle 18, but the movements of which around said axle, are absolutely independent of those of the lever 12—19 above mentioned. The lever 14 has a handle 17, and two lugs 15 and 16, placed respectively in the path of lugs 23 and 21, which are adjustably mounted on the table $b$ of the plane. The lug 21 is carried by a lug arm 20, which is adapted to strike the upper end of the arm 19 of the lever 12—19.

The member 23 is mounted on a plate 24 and this plate and the lug arm 20 are adjustably fixed to the movable table by means of bolts or the like $24^a$.

The bar 3 has a cam slot 5 which engages a pin 6 fixed to the fork 7, and it is obvious that when the bar 3 is moved axially, the pin 6 will move along the cam slot 5 and thus move the clutch fork 7 in the direction of the shaft $g$.

The operation of the mechanism is as follows:

At rest, the belts 27 and 28 are respectively on the idle pulleys 26 and 1 and the clutch plates $d'$ and 2 are separated. The lever 14, slide 29 and pins 37 and 38, occupy the positions shown on the drawings. At this time the bar 3 is at the limit of its left hand movement and the lever 12—19 occupies the position shown in full lines in Fig. 1 of the drawings.

To set the machine in operation, the operator grasps the handle 17 and moves, for example, the lever 14 toward the arrow 41, and consequently the slide 29 moves toward the left. This causes the pin 37 to move into the inclined portion 30 of the slot 30—30', and consequently the arm of the loop 32 is turned slightly in a clockwise direction so as to shift the belt 28 from the idle pulley 1 onto the forward movement pulley 25, while the pin 38 remains stationary, due to the fact that it now occupies the portion 31 of the cam slot 31—31'.

The pulley 25, as a result drives the shaft $g$ in a clockwise direction, so that the table $b$ moves in the direction of the arrow $41^a$. The gearing of the machine is so timed, that shortly after the beginning of the working stroke, the lug 10 of the disk 11, which always turns in a counter-clockwise manner, acts on the dog 8 and moves the bar 3 toward the right. The disk 11 is rotated in the usual manner from the table $b$ and it functions to control the tool advancing mechanism. For mechanism of this character, see the following U. S. patents: Sellars 324908, Dec. 13, 1887; Coes, 459393, Sept. 15, 1891; McIndoe, 479606, July 26, 1892; Norton 539,078, May 14, 1895; Gordon 579976, April 6, 1897.

When the lug 10 moves the bar 3 toward the right, the levers 12—19 will come into the position shown in dotted lines in Fig. 1. This movement of the bar 3, in the direction opposite to arrow 40, causes the cam slot 5 to move the clutch fork 7 toward the right in Figure 3 and to thus bring the clutch faces $d'$ and 2 into engagement. The pulley $d$, which is driven from an independent motor, by belts or the like, (not shown) thus adds to the power furnished by pulley 25 to the shaft $g$ and this auxiliary power furnished by the pulley $d$ acts for the working travel or stroke, or until the lug 20 strikes against the arm 19 and brings the lever 12—19 into the position shown in full lines in Fig. 1. The bar 3 is thus moved in the direction of the arrow 40 and the cam slot 5 causes the clutch fork 7 to disconnect the clutch faces $d'$ and 2. This movement takes place while the tool is at the point of completion of its travel or working stroke. The table $b$ continues to move in the direction of the arrow $41^a$ for a distance equal to the horizontal distance which separates the two lugs 20 and 21, and this latter lug 21 then acts on the lug 16 to move the lever 14 in a clockwise direction. Consequently the slide 29 is shifted toward the right and this causes the pin 37 to move into the portion 30' of its cam slot, and the pin 38 to move into the inclined portion 31' of its cam slot. Hence the belt 28 is first shifted to the pulley 1 and then the belt 27 is moved to the pulley 25', and the table $b$ is rapidly returned toward the left. This idle return of the table continues until the stop 23 (which moves with the table) acts on the lug 15 of the lever 14 and carries the latter counter-clockwise for a distance at least equal to that which separates the ends of each of the cam slot 30—30' or 31—31', of the slide 29, which slide is then moved to the left.

This sets the belts 28 and 27 for a second forward movement of the table $b$ and the table then begins its working travel again in the direction of the arrow $41^a$. As before stated the mechanism is so timed that the lug 10 is in proper position at the beginning of the working stroke of the table to always strike the dog 8, shortly after the table $b$ has commenced its working stroke toward the right.

The same movements which have been described are periodically reproduced until, by actuating the handle 17, the slide 29 is brought to its neutral position, that is, centrally between its two end positions. This neutral position is shown in Figure 2, and as may be seen the loops 32 and 33 hold the belts 27 and 28 on the idle pulleys 26 and 1. The stoppage of the machine is thus produced, that is, the table $b$ moves until the lug 20 acts on the arm 19 to disengage the clutch plates $d'$ and 2, in case the handle 17 is put in the stop position while the table is making a working stroke. If the handle 17 is put in the stop position while the table is returning toward the left, that is, when the clutch plates $d'$ and 2 are disengaged the machine is stopped almost instantaneously.

Figure 6:
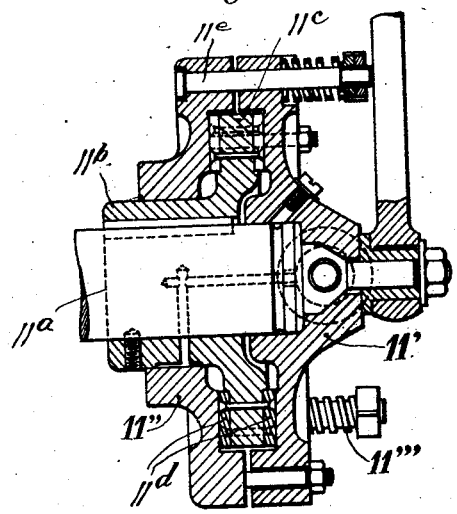
Fig. 6 is a diametrical section of the plate for actuating the tool feeding device.

The shaft $11^a$ (Figure 6) is that which, in known manner, actuates the tool advancing mechanism. This shaft carries a sleeve $11^b$, which is keyed thereon and provided with a flange $11^c$ having on each of its faces leather washers $11^d$, one of which bears against the crank plate 11' provided with a diametrical groove, and the other of which bears against the shell 11''. The crank 11' and the shell 11'' are pressed against the leather washers $11^d$ by means of springs 11''', the tension of which is regulatable. These springs are mounted about pins $11^e$, the heads of which are attached to the shell 11'' and the rods of which pass freely through smooth holes arranged near the periphery of the crank plate 11'', said holes being equally distributed around the latter.

The adhesion which results on contact of members 11' and 11'' with the leather washers $11^d$, causes the shaft $11^a$ to be carried along when the crank disk 11' is rotated, thus overcoming the resistance set up by the advance of the tool, but when these resistances increase abnormally, through any accidental cause, the crank plate 11' and shell 11'' slide on the leather washers $11^d$ without carrying along the sleeve $11^b$, thus avoiding breakage of the tool or elements effecting the transverse movement or advance of said tool.

Having now particularly described and ascertained the nature of my said invention and in what manner the same is to be performed, I declare that what I claim is:—

1. In a planing machine, a table, driving means for the table, a driving member adapted to be actuated by one source of power for moving the driving means and causing forward movement of the table, a second driving member adapted to be actuated by a second source of power for applying additional power to the driving means during a portion of the forward stroke of the table, a third member adapted to be actuated by the first mentioned source of power for rapidly returning the table to its starting position, and means for automatically effecting the connection and disconnection of said members to the driving means.

2. A planing machine as claimed in claim 1 in which the driving means includes a driven shaft, a double pulley fixed to the shaft and having drums of different diameters, the first mentioned driving member consisting of a crossed belt engageable with the largest one of the drums, and the third member consisting of a straight belt engageable with the smaller one of the drums.

3. A planing machine as claimed in claim 1 in which the driving means includes a driven shaft, a large pulley and a small pulley loosely mounted on the shaft, and a double pulley fixed to the shaft and having drums, one of the same size as the large pulley and the other the same size as the small pulley, said first mentioned member being engageable with the large pulley and the large drum, and the third member being engageable with the small pulley and the small drum.

4. A planing machine as claimed in claim 1 in which the driving means includes a driven shaft, a clutch element fixed to said shaft, a second clutch element loosely mounted on the shaft and arranged to engage and disengage the first clutch element, and a pulley fixed to rotate with the second clutch element, said second member engaging said pulley.

5. In a planing machine, a table, a shaft for actuating said table, a clutch element and a double pulley fixed to the shaft, a large pulley and a small pulley loosely mounted on the shaft, said double pulley having a large drum of the same size as the large pulley and a small drum of the same size as the small pulley, a crossed belt adapted to be driven by one source of power and to be shifted from the large pulley to the large drum and vice versa, a straight belt adapted to be driven by the same source of power and to be shifted from the small pulley to the small drum and vice versa, a second clutch element loosely mounted on the shaft and adapted to be moved axially on said shaft to engage and disengage the first clutch element, a third pulley fixed to the second clutch element and adapted to be driven by a separate source of power for applying additional power to the shaft during a portion of the working stroke of the table, a pivoted lever, a rod connected to said lever and provided with means for causing shifting of the second clutch element when the rod is reciprocated, means for shifting said rod in one direction, projections on the table engageable with said lever for shifting the rod in the opposite direction, a link connected to said lever, and a belt shifter actuated by said link and engaging said belts for shifting the crossed belt from the large pulley to the large drum and the straight belt from the small pulley to the small drum and vice versa.

In testimony whereof I have signed my name to this specification.

CHARLES BERTHIEZ.